(12) United States Patent
Tanaka et al.

(10) Patent No.: US 6,985,110 B2
(45) Date of Patent: Jan. 10, 2006

(54) ANTENNA DEVICE, WIRELESS COMMUNICATION TERMINAL, EXTERNAL ANTENNA AND HAND-STRAP

(75) Inventors: Tetsuya Tanaka, Hyogo (JP); Yonehiko Sunahara, Hyogo (JP); Yasuhito Imanishi, Hyogo (JP); Hirokazu Taketomi, Hyogo (JP); Shigeru Makino, Hyogo (JP) Toru; Toru Fukasawa, Hyogo (JP); Yasuhiro Nishioka, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 8 days.

(21) Appl. No.: 10/487,239

(22) PCT Filed: Aug. 31, 2001

(86) PCT No.: PCT/JP01/07531

§ 371 (c)(1),
(2), (4) Date: Feb. 27, 2004

(87) PCT Pub. No.: WO03/021716

PCT Pub. Date: Mar. 13, 2003

(65) Prior Publication Data

US 2005/0001771 A1    Jan. 6, 2005

(51) Int. Cl.
*H01Q 1/24* (2006.01)
(52) U.S. Cl. .......................... 343/702; 455/90
(58) Field of Classification Search ............. 343/702, 343/700 MS, 718, 895; 455/90
See application file for complete search history.

(56) References Cited

U.S. PATENT DOCUMENTS

| | | | |
|---|---|---|---|
| 5,504,494 A |  | 4/1996 | Chatzipetros et al. ....... 343/702 |
| 6,556,812 B1 | * | 4/2003 | Pennanen et al. ........... 343/702 |
| 6,611,504 B1 | * | 8/2003 | Kanda et al. ............... 370/310 |
| 6,856,819 B2 | * | 2/2005 | Itoh ....................... 455/575.7 |

FOREIGN PATENT DOCUMENTS

| | | |
|---|---|---|
| JP | 6-7305 | 1/1994 |
| JP | 6-85730 | 3/1994 |
| JP | 7-94923 | 4/1995 |
| JP | 8-186518 | 7/1996 |
| JP | 11-220418 | 8/1999 |
| JP | 2000-500315 | 1/2000 |
| JP | 2000-114865 | 4/2000 |

* cited by examiner

*Primary Examiner*—Hoang V. Nguyen
(74) *Attorney, Agent, or Firm*—Oblon, Spivak, McClelland, Maier & Neustadt, P.C.

(57) ABSTRACT

An antenna device, a radio communication terminal, an external antenna, and a hand strap can be provided, which are capable of ensuring satisfactory communication performance without being affected by the surrounding environment even in an area where the electric field is weak, and having the antenna performance improved by slightly modifying the body of an existing radio communication device. The antenna device according to the present invention includes an internal antenna (2) electrically connected to and incorporated into a circuit for radio communication within a case (1) and an external antenna (3) externally attached to the case.

9 Claims, 12 Drawing Sheets

UPPER PORTION

LOWER PORTION

FIG.3A  FIG.3B  FIG.3C
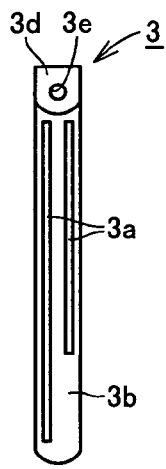 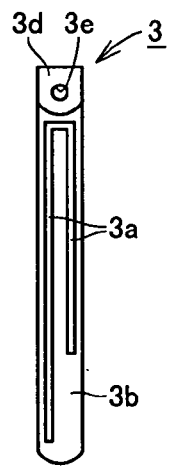 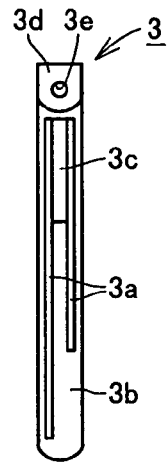
FIG.3D  FIG.3E
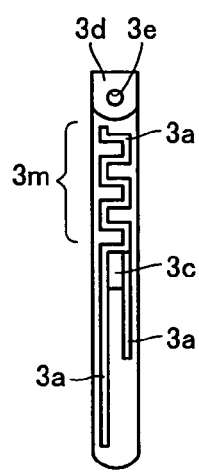 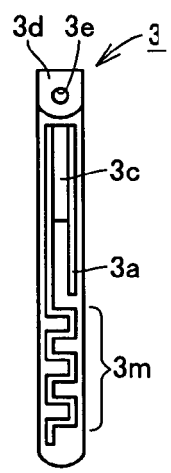

CURRENT DENSITY i →

CURRENT DENSITY i →

ANTENNA DEVICE, WIRELESS COMMUNICATION TERMINAL, EXTERNAL ANTENNA AND HAND-STRAP

TECHNICAL FIELD

The present invention relates to an antenna device, a radio communication terminal with the antenna device, and an external antenna and a hand strap constituting the antenna device.

BACKGROUND ART

A radio communication terminal includes a whip antenna utilized generally in a pulled-out position and an accommodated position. This whip antenna 130 has a helical antenna 112 at its tip. When the whip antenna is accommodated within a case 101 of a radio communication terminal 110 as shown in FIG. 24, only helical antenna 112 is exposed at case 101. In this case, a feeding point 115 is located at the base of helical antenna 112 as shown in FIG. 25. In other words, only helical antenna 112 serves as an antenna. The electrical length of the antenna in this case is substantially equal to the length of a straightened conductor forming the helical coil.

In contrast, when whip antenna 130 is pulled out as shown in FIG. 26, the base of an exposed whip portion 113, that is, the base of a linear portion serves as feeding point 115. An electrical length LE in this case is substantially equal to the length of the portion from feeding point 115 to the base of the helical antenna in the pulled-out direction as shown in FIG. 27. The antenna in this case is formed from pulled-out whip portion 113. Therefore, as long as the electrical length is adapted to the wavelength of the radio wave to be used, a conversation capacity should be obtained in both cases where the whip antenna is pulled out and the whip antenna is accommodated within the case. In this context, "adapting the conductor's length or the like to the wavelength of the radio wave" means that the electrical length of that conductor is set to have a length corresponding to a prescribed wavelength or a prescribed fraction of that wavelength.

A better communication performance, however, can be achieved when the whip antenna takes the pulled-out state than in the accommodated state because: (a) the likelihood increases of attaining a state away from an interfering environment such as the user's face or head in the pulled-out; and (b) a linear antenna often has higher radiation efficiency than a helical antenna state.

The whip antenna as described above also utilizes the ground in the mobile telephone to operate as a dipole antenna. In transmission or reception, an excitation current is induced at this dipole antenna by a radio wave (FIG. 28). An antenna at which a larger excitation current is induced by the same radio wave is regarded to have higher communication performance. As shown in FIG. 29, the excitation current is distributed over the whip antenna and the ground in the mobile telephone when the whip antenna is pulled out.

In general, in an area where the electric field is strong, such as in an urban area with a base station located nearby, a strong radio wave is transmitted and received between the base station and an antenna device. Therefore, even when the whip antenna is accommodated within the case, it can transmit and receive radio waves without any problems. In an area far away from the base station where the electric field is weak, however, the whip antenna may not be able to transmit and receive radio waves smoothly if it is accommodated within the case. That is, since the radio communication terminal is usually carried by a user with the whip antenna accommodated within the case, it may not be able to detect reception, for example. In addition, in view of the portability or the like, the idea of forcing customers to carry mobile telephones with the whip antennas always pulled out is not acceptable.

An approach set forth below has been taken to solve the above-described problems. As shown in FIG. 30, a mobile telephone has been proposed that has a structure in which a hand strap 101 and an antenna 102 are integrated and attached to a mobile telephone 110, or a structure in which the antenna itself serves as a hand strap (Japanese Utility Model Laying Open No. 6-7305). According to this configuration, the hand strap itself or a portion embedded in the hand strap substitutes for a pulled-out portion 104 of an antenna. Since the hand strap is always provided outside a case 103, the state in which the whip antenna is always pulled out can be realized in the mobile telephone as described above. In addition, a user would not feel uncomfortable about the mobile telephone with the hand strap attached at the external side of the case. Therefore, radio waves can be transmitted and received without any problems even in the area where the electric field is weak.

In the antenna's configuration as described above, the overall performance of the antenna will depend on the antenna incorporated into the hand strap. In other words, the whole antenna is located within the hand strap.

The performance of an antenna varies widely depending on the environment surrounding the antenna. In addition, the environment for a hand strap varies depending on how the user carries his/her mobile telephone. Therefore, the overall performance of the antenna may be affected by the way that the user carries his/her mobile telephone. Accordingly, a possibility of the overall communication performance being influenced by the user's way of carrying his/her mobile telephone cannot be denied.

Mobile telephones are utilized by all people regardless of sex and age, at any time day and night, and in any environment. Therefore, it is not preferred that an antenna affecting the communication performance depends on such a configuration as described above. There is a need for ensuring high communication performance even in a weak-electric-field area by means of the more stable configuration without any discomfort on the user's side.

Apart from the problems as discussed above, there is sometimes a need for improving only the communication performance of an existing radio communication device in a short preparation time while taking advantage of most of its characteristics. In other words, it is sometimes desired to make improvements in communication performance in a short preparation time by making only slight changes to the design of the conventional radio communication device. Conventionally, when improvements in communication performance are required, changes have been made to the specification of the circuit of a radio unit connected to an antenna or an antenna's system. Alternatively, instead of changing the antenna's system, at least its shape has been changed significantly. In such a way of improving the antenna's performance, circuitry of the radio communication device had to be designed again or a new mold must be fabricated again. Therefore, the preparation was often time-consuming and it sometimes took a long time before the products became available in the market.

DISCLOSURE OF THE INVENTION

It is an object of the present invention to provide an antenna device capable of ensuring satisfactory communication performance without being affected by the environment surrounding a radio communication device even in an area where the electric field is weak, a radio communication terminal with that antenna device, an external antenna that is a component of that antenna device, and a hand strap utilized as the external antenna. Another object of the present invention is to provide an antenna device, a radio communication terminal, an external antenna, and a hand strap, improved in antenna performance by slightly modifying the body of an existing radio communication device.

An antenna device according to the present invention includes an internal antenna electrically connected to and incorporated into a circuit for radio communication within a case, and an external antenna externally attached to the case and facing the internal antenna with the case therebetween to be electromagnetically coupled with the internal antenna.

As a result of this configuration, the internal antenna can ensure the basic performance of the antenna, while the external antenna can additionally improve the performance of the antenna. In contrast to the case where the external antenna alone is utilized for the whole operation of antenna, the antenna's performance in this case is ensured at a level of at least the prescribed performance in any environment.

In the antenna device according to the present invention, the external and internal antennas are arranged facing each other with the case therebetween so that they can electromagnetically be coupled. Therefore, the external antenna is excited by its electromagnetic coupling with the internal antenna. Through operation of the two antennas, the performance of the antenna can be improved. Here, the described facing configuration for the electromagnetic coupling refers to a state in which a large solid angle of at least a prescribed degree can be subtended at the external antenna by the internal antenna. When internal antennas are provided at respective walls meeting at an angle, each solid angle subtended by each internal antenna needs to have at least a prescribed degree. In addition, when the internal antenna is formed surrounding a prescribed space, the internal antenna includes that space as well.

By the configuration as described above, the internal and external antennas are inductively and/or capacitively coupled. As a result, if at least the internal antenna is designed to assure the antenna's basic performance having a prescribed value even in an area where the electric field is weak, the extra increase in performance by virtue of the external antenna can improve the performance of the whole antenna. The internal and external antennas include conductors having lengths (electrical lengths) that are ½, ¼, and ⅜ wavelengths of utilized radio waves.

In addition, according to the configuration as described above, if there is an existing radio communication device absent on an external antenna, the external antenna according to the present invention may be attached thereto so that the communication performance can easily be improved. Furthermore, if portions other than the external antenna have already been designed, these already-designed portions may be used as they are and the external antenna according to the present invention can be attached thereto to improve the performance of the antenna in a short preparation time. As a result, satisfactory communication performance can be assured in a stable manner even in an area where the electric field is weak within a limited preparation time.

It is noted that the external antenna may be or does not have to be electrically connected to and fed directly from the circuit within the case as long as it is externally attached to the case.

In the antenna device according to the present invention, the external antenna is not electrically connected to the circuit within the case. Accordingly, the external antenna is not fed directly from the circuit. Therefore, if portions other than the external antenna have already been designed, the design of the circuit or a mold for the case need not be changed to improve the communication performance.

In the antenna device according to the present invention, the internal antenna can include a plurality of portions resonating at a plurality of frequencies respectively. The external antenna can include a plurality of portions resonating at the plurality of frequencies respectively. This configuration can also be described as in the following. That is, in the antenna device according to the present invention, the internal antenna includes a first internal antenna having a length adapted to a wavelength of a first radio wave, and a second internal antenna having a length adapted to a wavelength of a second radio wave different from the first radio wave. The external antenna includes a first external antenna having a length adapted to the wavelength of the first radio wave and a second external antenna having a length adapted to the wavelength of the second radio wave.

As a result of this configuration, the number of internal and external antennas provided each corresponds to the number of frequency bands. Accordingly, highly advanced performance can be achieved for transmission and reception in all the frequency bands. In this case, the electrical length of the antenna adapted to the wavelength of the radio wave is set to ½, ⅜, and ¼ the wavelength of the radio wave.

A radio communication terminal according to the present invention is a portable radio communication terminal including a case accommodating a circuit for radio communication, an internal antenna electrically connected to and incorporated into the circuit, and an external antenna externally attached to the case and facing the internal antenna with the case therebetween to be electromagnetically coupled with the internal antenna.

As a result of this configuration, the internal antenna can ensure the basic performance of the antenna, while the external antenna can additionally improve the communication performance of the radio communication terminal. Therefore, in contrast to the case where the external antenna alone is utilized for the whole operation of antenna, the communication performance in this case is ensured at a level of at least the prescribed performance in any environment. As a result, if at least the internal antenna is designed to assure the basic communication performance having a prescribed value even in an area where the electric field is weak, the extra increase in performance by virtue of the external antenna can improve the performance of the whole antenna. The radio communication terminal includes a mobile telephone, Personal Digital Assistant, and a wireless radio communication device. Either of the internal and external antennas is not limited in its electrical length to ¼ a wavelength. For example, they may have electrical lengths that are ½ or ⅜ the wavelength. Furthermore, the internal and external antennas may have electrical lengths different from each other.

According to this configuration, if there is an existing radio communication terminal device absent on an external antenna, the external antenna according to the present invention can be attached thereto to improve the communication performance in a simple manner. In addition, if portions other than the external antenna have already been designed, these already-designed portions can be used as they are. In this way, the effect of the external antenna can be brought about in a short preparation time. As a result, the communication performance of the radio communication terminal can be improved in a short preparation time. The improvement in communication performance achieved in a short preparation time is particularly important to the frequently remodeled mobile telephones or Personal Digital Assistants.

It is noted that the external antenna may be or does not have to be electrically connected to and fed directly from the circuit within the case as long as it is externally attached to the case.

In the radio communication terminal according to the present invention, the external antenna is not electrically connected to and fed from the circuit.

Therefore, if the radio communication terminal absent on the external antenna has already been designed, the design of the circuit or a mold for the case needs not be changed to improve the communication performance of the radio communication terminal.

The radio communication terminal according to the present invention includes at least a receiver. The receiver is preferably attached to one side of the case. The internal and external antennas are each preferably attached to a side opposite to the one side.

According to this configuration, when a user holds the receiver to his/her ear, the external antenna is located at the side of the case opposite to the user. As a result, while the external and internal antennas are elecromagnetically coupled, the receiver at the upper portion on the one side of the case can be held against the user's ear without any problems. That is, it is possible to avoid a disadvantage that would be caused by the external antenna provided at the same side as the receiver, i.e. an inconvenient situation where the user's head could be an obstacle to the radiation of the antenna when the user holds the receiver to his/her ear for conversation.

The radio communication terminal according to the present invention includes at least a receiver and a microphone. The receiver and the microphone are attached to one side of the case. The internal and external antennas are each attached to a side opposite to the one side.

This configuration provides an appropriate conversation state for the user to hold the receiver to his/her ear and speak into the microphone at the same time. That is, during use of the telephone, the external antenna is located at the side opposite to the user's face. Therefore, the external antenna will not be located between the user and the radio communication terminal while the telephone is used. As a result, it is possible to avoid degradation in performance caused by the user's head being an obstacle to the radiation of the antenna.

In the radio communication terminal according to the present invention, the internal and external antennas can be located at an upper portion on the side opposite to the one side.

The external antenna is often located within the same height range as the case of the radio communication terminal. When such a configuration is to be realized, one end of a linear conductor or a hand strap, for example, with a linear conductor incorporated thereinto is located at the top of the case. Furthermore, by attaching the one end of the linear conductor or the like to a position corresponding to the midpoint of the width of the internal antenna located at the upper portion of the case, the linear conductor or the like can have a portion facing the internal antenna even when the linear conductor is inclined in accordance with the way that the user holds the case. That is, even when the linear conductor or the like is inclined to the left or to the right with respect to the vertical line passing through the described midpoint of the width, the linear conductor has a portion facing the left and right portions of the internal antenna with respect to the vertical line. As a result, electromagnetic coupling between the internal and external antennas can be ensured so that high communication performance can be guaranteed.

In the radio communication terminal according to the present invention, the internal and external antennas can be located at a lower portion on the side opposite to the one side where the receiver is provided.

As a result of this configuration, both of the external and internal antennas are located around the user's side face or neck. Therefore, in comparison with the case where the antennas are located in the proximity of the user's head, the radiation of the antenna is less likely to be cut off. Accordingly, the communication performance can further be improved.

In the radio communication terminal according to the present invention, the external antenna can be movably attached to the case by a binding force sufficient to keep the external antenna attached to the case. The external antenna has a portion facing the internal antenna with the case therebetween such that the external antenna is electromagnetically coupled with the internal antenna when the receiver is held against the user's ear.

As a result of this configuration, the internal and external antennas are not electromagnetically coupled when the mobile telephone is not in use, and the electromagnetic coupling can be established at a prescribed time such as when the mobile telephone is in use. Therefore, when the telephone is not in use, the external antenna can be located at such a place as to facilitate the portability of the telephone, and high communication performance can be ensured only when the telephone is in use.

Gravity exerted on the external antenna may naturally bring the external antenna to a position where it would electromagnetically be coupled with the internal antenna. Moreover, the user may change the position of the external antenna or engage a portion of the external antenna other than an antenna portion with an engagement portion of the case so that the electromagnetic coupling can be achieved.

In the radio communication terminal according to the present invention, the external antenna is a linear conductor and has its one end held by the case.

As a result of this configuration, the external antenna can be achieved readily. This linear conductor may be any elongated conductor. It may be a string-like conductor without any particularly defined shape or a wire-like conductor or a bar-like conductor. In addition, the linear conductor may be embedded in an insulator such as resin or incorporated into a string or the like of a hand strap. That is, in the configuration as described above, one end of a holder holding the linear conductor may be held by the case.

In the radio communication terminal according to the present invention, the linear conductor has its one end pivotably held by the case.

As a result of this configuration, the user may feel that the linear conductor is just like a hand strap. Therefore, the external antenna capable of improving the communication performance can be provided without making the user feel that an extra component has been added.

In the radio communication terminal according to the present invention, at least one of a meandering portion and a helical portion is included in the linear conductor.

By this configuration, the length of the external antenna can be reduced while its electrical length is adapted to a wavelength of a utilized radio wave. As a result, the external antenna can be downsized responding to the miniaturization of the radio communication terminal. In addition, the design of the external antenna can be selected from among more alternatives because its length can be reduced for its design for example.

In the radio communication terminal according to the present invention, the external antenna is a linear conductor incorporated into a hand strap attached to the case of the radio communication terminal.

As a result of this configuration, the external antenna can be provided without the user's recognition that it is actually an external antenna. This results in high communication performance being ensured in a very simple and stable manner.

In the radio communication terminal according to the present invention, the case can include an engagement portion engaging with a portion of the hand strap to enable the linear conductor to face the internal antenna such that the linear conductor is electromagnetically coupled with the internal antenna.

This configuration ensures the electromagnetic coupling between the internal and external antennas even if a long hand strap is employed.

In the radio communication terminal according to the present invention, when the internal antenna is divided into one portion and another portion about a border line passing through a midpoint of the internal antenna and extending in a longitudinal direction of the case, the one portion of the internal antenna can be arranged to approximate the arrangement of the another portion of the internal antenna.

As a result of this configuration, when the external antenna is a linear conductor and has its end pivotally attached to the case, there will be no difference in communication performance regardless of whether the radio communication terminal is held by a right hand or by a left hand.

The aforementioned approximating range includes a range in which the electromagnetic coupling is of the same level when the longitudinally-extending line passing through the midpoint of the width of the internal antenna is inclined at the same angle to the right and to the left with respect to the vertical line. For example, the event of the one and the other portions of the internal antenna being arranged symmetrical, disregarding the deviation of the vertical line, is definitely included in the range.

In the radio communication terminal according to the present invention, the external antenna can take the configuration of a conductor provided at a plate-shaped body attached to the case.

In this configuration, a plate-shaped conductor may be provided at the plate-shaped body. Therefore, the internal and external antennas can be provided with enhanced electromagnetic coupling therebetween. As a result, the electromagnetic coupling cannot be affected by the way that the radio communication terminal is carried. Therefore, the performance can be stabilized.

In the radio communication terminal according to the present invention, the external antenna can be a conductor provided at a plate-shaped body movably attached to the case.

In this configuration, high electromagnetic coupling can be ensured between the internal and external antennas. In addition, it is also possible to achieve a configuration in which no electromagnetic coupling is established between the internal and external antennas when the mobile telephone is not in use. Therefore, the communication capability in a used mode can be improved significantly while ensuring the capability of the internal antenna to merely detect reception in an area where the electric field is weak in a non-used mode.

In the radio communication terminal according to the present invention, the external antenna can be a conductor detachably inserted in a cap detachably fit in the top of the case.

As a result of this configuration, the external antenna can be provided with little, if any, influence on the structure of the body of the radio communication terminal. The cap may be any component to be fit in the top of the case. The cap may have a shape so as to cover the top of the case or a shape so as to fit in the periphery of the top in the same manner as a headband.

In the radio communication terminal according to the present invention, the internal antenna includes a plurality of portions resonating at a plurality of frequencies respectively. The external antenna includes a plurality of portions resonating at the plurality of frequencies respectively. This configuration can also be described as in the following. That is, in the radio communication terminal according to the present invention, the internal antenna includes a first internal antenna having a length adapted to a wavelength of a first radio wave, and a second internal antenna having a length adapted to a wavelength of a second radio wave different from the first radio wave. The external antenna includes a first external antenna having a length adapted to the wavelength of the first radio wave and a second external antenna having a length adapted to the wavelength of the second radio wave.

As a result of this configuration, the radio communication terminal with its communication performance improved in a simple manner can be adapted to multiple bands.

A hand strap according to the present invention is attached to a radio communication terminal with an internal antenna. The hand strap includes an attachment portion attached to the radio communication terminal and a linear conductor electromagnetically coupled with the internal antenna when the hand strap is attached to the radio communication terminal by the attachment portion.

By attaching the hand strap with this configuration to the case of the mobile telephone, the external antenna can be formed in a simple manner. The hand strap may be any type of hand strap as long as its linear conductor is provided at a portion other than an end of the attachment portion. For example, in order to enhance electromagnetic coupling between the internal and external antennas, various types of portions may be provided to adjust the position of the conductor. It is noted that the end of the attachment portion refers to a portion in contact with the case to be attached thereto, such as a portion of the attachment portion wound around and in contact with the case or a portion engaging and in contact with the case. Therefore, the conductor may be provided at the attachment portion, but not at its end.

In the hand strap according to the present invention, the linear conductor has a length adapted to a wavelength of a radio wave used for the radio communication terminal.

As a result of this configuration, the mobile telephone can easily resonate at a radio wave with a desired wavelength. Thus, the communication performance can be improved.

In the hand strap according to the present invention, the linear conductor includes a first linear conductor having a length adapted to a wavelength of a first radio wave and a second linear conductor having a length adapted to a wavelength of a second radio wave different from the first radio wave.

As a result of this configuration, an external antenna adapted to multiple bands can be implemented by the hand strap.

In the hand strap according to the present invention, the first and second linear conductors are embedded in flexible plate-shaped resin to be provided at the hand strap.

As a result of this configuration, the external antenna can easily be provided at the hand strap in a manner in which the linear conductors do not-cross each other. The flexible plate-shaped resin may be a flexible circuit board (flexible board) or a flexible resin plate constituting a cable with a conductor embedded therein.

An external antenna according to the present invention includes an attachment portion attached to a case of a radio communication terminal with an internal antenna, and a conductor having a length adapted to a wavelength of a radio wave for the radio communication terminal such that the external antenna can electromagnetically be coupled with the internal antenna when the external antenna is attached to the radio communication terminal by the attachment portion.

This configuration allows a simply-structured external antenna. The attachment portion may be provided directly at the conductor, at an insulating plate having the conductor, at resin with the conductor embedded therein, or at the conductor itself.

In the external antenna according to the present invention, the conductor includes a first conductor having a length adapted to a wavelength of a first radio wave and a second conductor having a length adapted to a wavelength of a second radio wave different from the first radio wave. In other words, the conductor can include conductors having different lengths adapted to wavelengths of a plurality of radio waves.

As a result of this configuration, an external antenna adapted not only to dual bands but also to multiple bands can simply be provided.

The aforementioned and other objects, features, aspects, and effects of the present invention will become more apparent by reference to the following detailed description of the present invention taken in conjunction with the accompanying drawings.

BRIEF DESCRIPTION OF THE DRAWINGS

FIG. 3A shows an example of an external antenna of a linear conductor in FIG. 1.

FIG. 3B shows another example of the linear conductor in FIG. 3A.

FIG. 3C shows a further example of the linear conductor in FIG. 3A.

FIG. 3D shows a still further example of the linear conductor in FIG. 3A.

FIG. 3E shows another example of the linear conductor in FIG. 3D.

BEST MODES FOR CARRYING OUT THE INVENTION

In the following, embodiments of the present invention will be described with reference to the drawings.

(First Embodiment)

Figure 1:
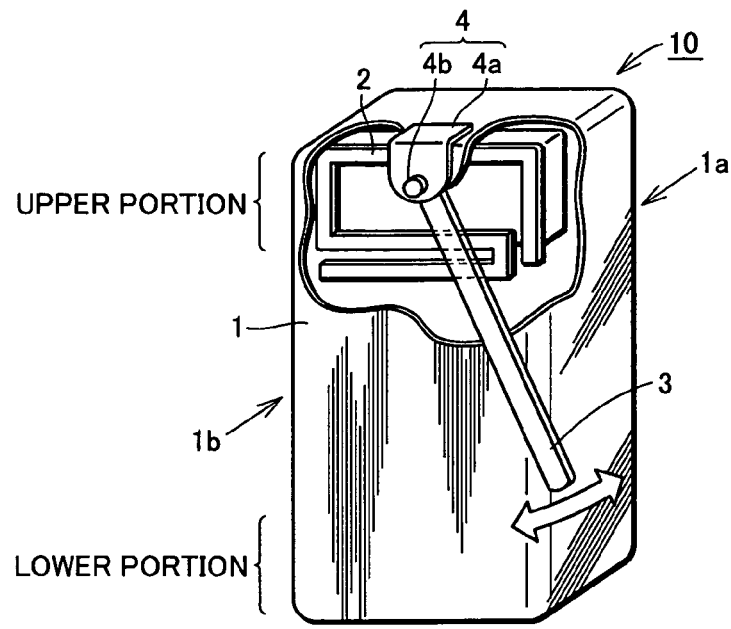
FIG. 1 is a perspective view of a mobile telephone in accordance with a first embodiment of the present invention.

FIG. 1 is a perspective view showing the backside of a radio communication terminal in accordance with a first embodiment of the present invention. This radio communication terminal 10 is a communication device adapted to dual bands that is capable of transmitting and receiving radio waves of frequencies in an 800 MHz band and a 1.5 GHz band, for example. An internal antenna 2 incorporated into a circuit of this radio communication terminal is provided inside the case at the backside of the radio communication terminal. An external antenna 3 that is a linear conductor has its end rotatably attached to the outer side of case 1 by an attachment hook 4. Attachment hook 4 includes an attachment plate 4a and an attachment pin 4b. By means of attachment pin 4b, the linear conductor is pivotably attached to the case.

In order to enhance electromagnetic coupling between internal antenna 2 and external antenna 3, the internal and external antennas are placed such that the distance therebetween becomes small. Thus, the internal antenna is preferably provided close to a backside 1b of case 1, while linear conductor 3 is preferably provided such that it comes close to, or if possible contacts, backside 1b of the case.

Furthermore, in order to enhance the electromagnetic coupling between the internal and external antennas, the linear conductor is desirably provided such that, in a plan view, it crosses internal antenna 2 surrounding a space. That is, the linear conductor and the internal antenna are desirably provided such that they each have portions facing each other with case 1 therebetween. In this state, the solid angle subtended at the external antenna by the internal antenna is consequentially large as described above.

Figure 2:
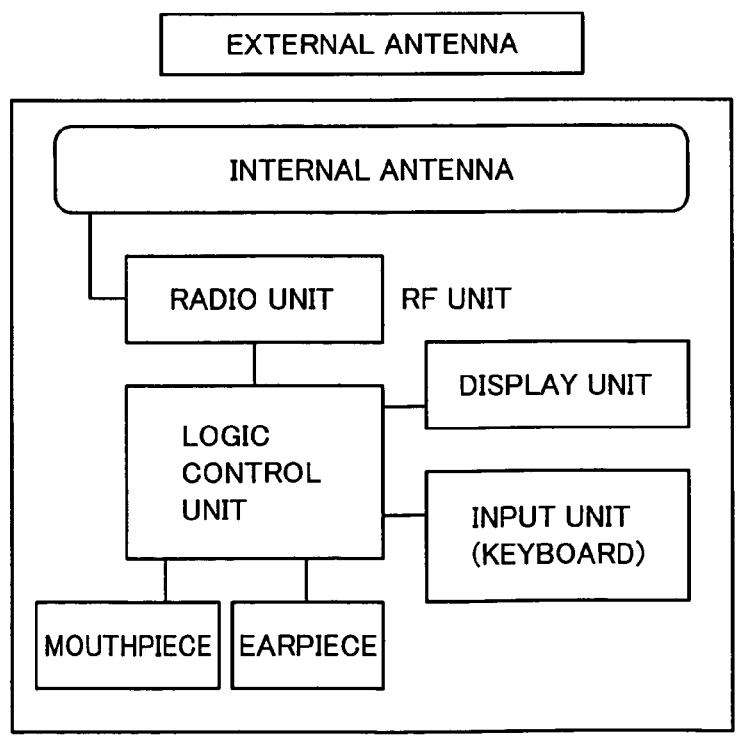
FIG. 2 is a block diagram showing the mobile telephone in FIG. 1.

FIG. 2 is a block diagram showing the radio communication terminal in FIG. 1. A mouthpiece includes a microphone or the like. An earpiece includes a receiver or the like. An input unit includes a keyboard or the like. A liquid crystal display device or the like is employed as a display unit. An antenna includes the internal antenna fed from a radio unit and the external antenna having no electrical connection with any of the components as described above. The radio unit is provided with an impedance match circuit matching its impedance to that of the internal antenna. The radio unit also feeds a feeding point of the internal antenna or receives a signal from the feeding point. The external antenna has no feeding point. Therefore, the external antenna rarely influences the impedance matching as described above. The internal and external antennas are coupled by electromagnetic coupling, that is, inductive coupling and/or capacitive coupling. In addition, a logic control unit receives an electrical signal from each of the components as described above and, based on the signal, transmits a command signal to each component to control the operation of the radio communication terminal.

FIGS. 3A to 3E show various examples of the external antenna. All these external antennas have the configuration adapted to the dual bands and include two linear conductors 3a. The longer linear conductor has an electrical length adapted to a radio wave in the 800 MHz band, while the shorter linear conductor has an electrical length adapted to a radio wave in the 1.5 GHz band. The electrical length of the linear conductor is adjusted to correspond to approximately half the wavelength of the radio wave.

In FIG. 3A, two linear conductors 3a are both embedded in resin 3b. At the end of this external antenna to be attached to the case, an attachment portion 3d is provided. An attachment pin is inserted in a hole 3e of the attachment portion so that the external antenna is rotatably attached to the case of the radio communication terminal.

In the external antenna shown in FIG. 3B, the ends of two linear conductors 3a are linked to each other. Even though the ends are linked as shown, the linked conductors are regarded as two linear conductors adjusted to respective electrical lengths and each one of the two linear conductors resonates at one of the two types of electromagnetic waves as described above. It is noted, however, that some changes may be required for each electrical length.

In the external antenna shown in FIG. 3C, a prescribed range of the end portions of two linear conductors 3a are both connected to a conductor 3c. Even in this case as well, each of the two types of radio waves as described above resonates with one of the two linear conductors.

The external antenna shown in FIG. 3D is directed to reducing the length of the linear conductor. While the meandering portion of 3 meters reduces the length of the conductor in the longitudinal direction of resin, this external antenna has the same electrical length as the linear conductor in FIG. 3A or the like. In FIG. 3D, the 3-meter meandering portion is included in the electrical length of both the long and short linear conductors.

In the external antenna shown in FIG. 3E, the 3-meter meandering portion is included in the electrical length of only the longer linear conductor. This shape can easily be designed when the two frequency bands are far away from each other. The full length of the external antenna is determined by the length of the longer linear conductor. Therefore, the external antennas in FIGS. 3D and 3E are approximately the same in length.

Although not shown in the figures illustrating the external antennas, a helical coil may be employed instead of the 3-meter meandering portion or added to the meandering portion so that the full length of the external antenna can be reduced. Reduction in full length of the external antenna is preferable in that the portability of the radio communication terminal can be improved. The provision of the meandering portion and/or the helical coil is advantageous in reducing the full length of the external antenna.

Figure 4:
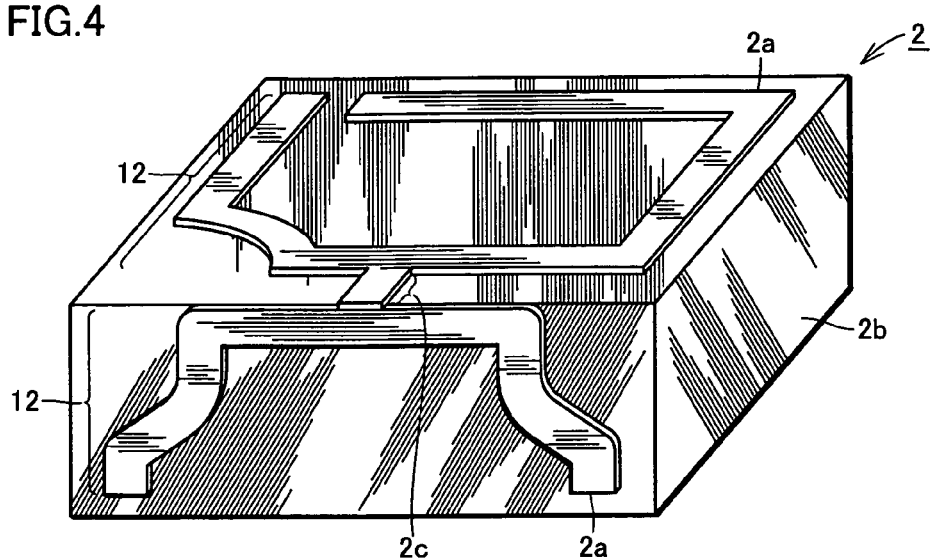
FIG. 4 shows an internal antenna different from the internal antenna shown in FIG. 1.

FIG. 4 illustrates the shape of internal antenna 2. A conductor 2a of internal antenna 2 is attached to the surface of an insulator 2b. This internal antenna is also adapted to dual bands. In FIG. 4, the rear portion, that is the top, of internal antenna 2 is an internal antenna portion adapted to a radio wave in the 800 MHz band, while the front side of internal antenna 2 is an internal antenna portion adapted to a radio wave in the 1.5 GHz band. The internal antenna with such a shape is provided inside the case at the backside and the top of the case. The external antenna is externally provided at the upper portion of the case. In this configuration, large solid angles can be subtended at the external antenna by both of conductor portions 12. Therefore, when radio waves are received, enhanced electromagnetic coupling can be achieved between the internal and external antennas. The solid angles subtended at the external antenna by both of the conductor portions of the internal antenna need not be the same, but the solid angles each have to be larger than a prescribed angle.

The internal antenna adapted to the dual bands may have any shape. For example, two internal antennas may be provided on a single plane. The internal antennas need not be provided on respective planes meeting at an angle as described above.

Figure 5:
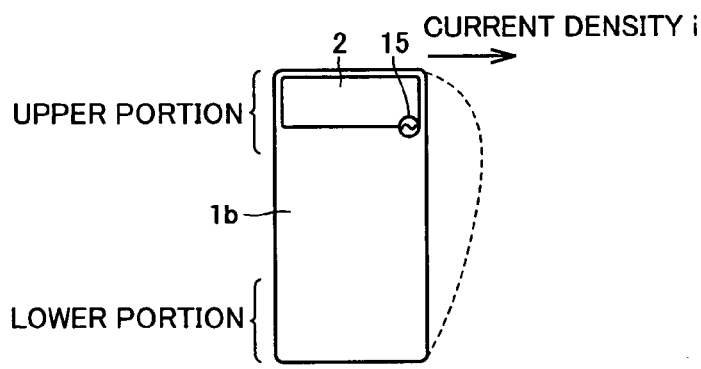
FIG. 5 shows a current density distribution of an excitation current produced at the internal antenna.
Figure 6:
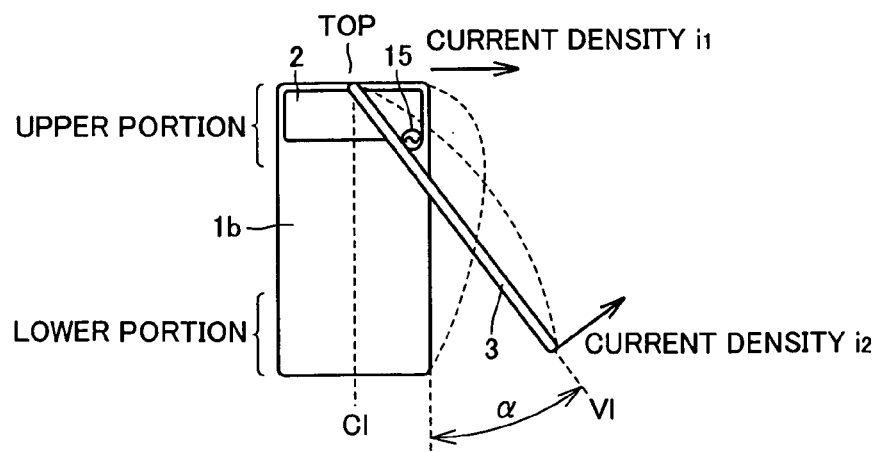
FIG. 6 shows current density distributions of excitation currents produced at the internal and external antennas.

The internal and external antennas as described above operate similarly to a dipole antenna. FIGS. 5 and 6 show current density distributions upon excitation of these antennas. When only the internal antenna is provided, a current flows throughout the ground in the radio communication terminal. The current density is maximized at a region close to the internal antenna. When the internal and external antennas are both provided, current flows through both of the internal and external antennas as shown in FIG. 6. Accordingly, the internal and external antennas both emit radio waves. Therefore, higher radiation efficiency can be achieved than in the case where only the internal antenna is provided. As a result, the radio communication terminal according to the present invention can achieve high communication performance, as compared to the case where only the internal antenna is provided.

Figure 7:
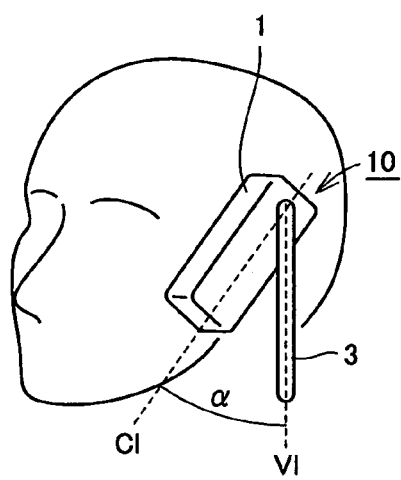
FIG. 7 shows a state in which the mobile telephone in FIG. 1 is being utilized by a user.

An angle α which the external antenna forms with the case in FIG. 6 is determined from the inclination of the mobile telephone in use as shown in FIG. 7. This angle α is formed by a vertical line Vl and a straight line Cl passing through the midpoint of the width of the internal antenna and extending in the longitudinal direction. As shown in FIG. 7, when the user holds the radio communication terminal to his/her ear, straight line Cl extending in the longitudinal direction of the radio communication terminal is inclined away from vertical line Vl. In contrast, the external antenna hangs down in the direction of vertical line Vl.

When the external antenna hangs down in the direction of vertical line Vl, the following advantage can be obtained. That is, since a radio wave transmitted from a base station is a vertically polarized wave, the external antenna can easily exhibit resonance at the vertically polarized wave from the base station. Therefore, degradation in communication performance due to loss of the polarized wave during communication can be prevented.

Figure 8:
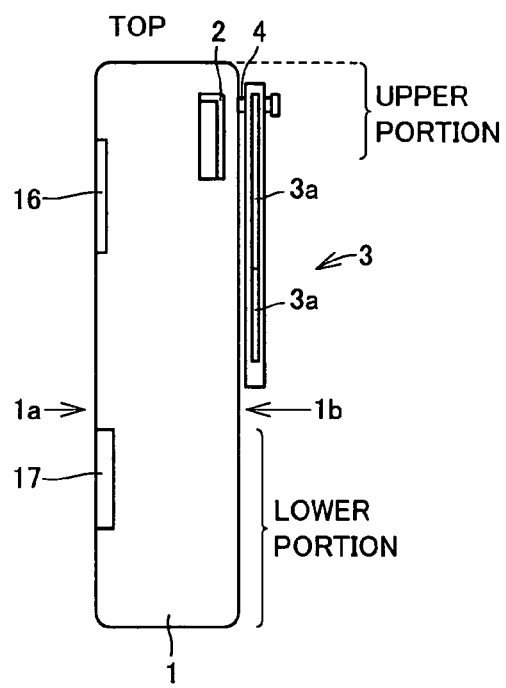
FIG. 8 is a side view of the mobile telephone in FIG. 1.

FIG. 8 is a side view of the radio communication terminal in FIG. 1. A receiver 16 and a microphone 17 are provided at the front side of the radio communication terminal. Internal antenna 2 is provided inside case 1 at the backside and the top of the case. External antenna 3 is externally provided at the case such that it faces the internal antenna. Providing the internal and external antennas close to each other as described above allows enhanced electromagnetic coupling between the internal and external antennas. Thus, it becomes possible to achieve an antenna with high communication performance resulting from the combination of the two antennas.

(Second Embodiment)

Figure 9:
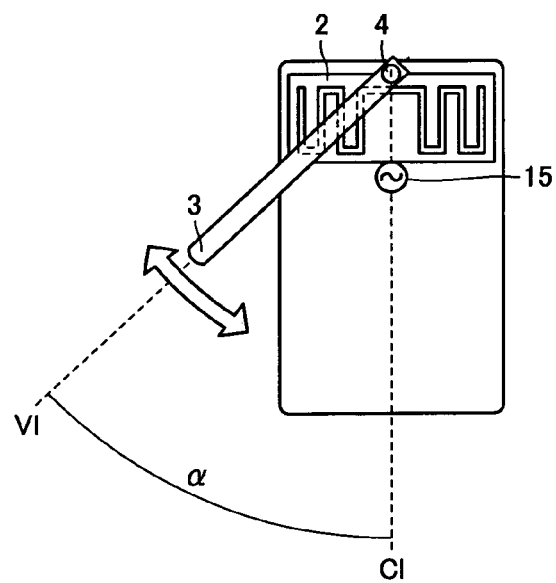
FIG. 9 shows a mobile telephone in accordance with a second embodiment of the present invention.

FIG. 9 shows the antenna of the radio communication terminal in accordance with the embodiment of the present invention. In the present embodiment, the internal antenna has its shape substantially symmetrical with respect to the longitudinal dashed lines. Therefore, whether the radio communication terminal is held by a right hand or by a left hand hardly affects the electromagnetic coupling between the internal and external antennas. The antenna as shown in FIG. 9 is adapted to a single band. In FIG. 9, the external antenna is inclined with respect to the case in a direction opposite from that in FIG. 1. In the normal case, FIG. 1 shows the direction of inclination of the external antenna when the radio communication terminal is held by a right hand, while FIG. 9 shows the direction of inclination when the terminal is held by a left hand for example. In FIG. 9, the shape of the internal antenna is symmetrical with respect to the longitudinally-extending straight line passing through the midpoint of the width of the internal antenna. Therefore, when the external antenna is inclined at the same angle as that of FIG. 9 in a direction opposite to that of FIG. 9, the same electromagnetic coupling as in the case of FIG. 9 can be obtained between the internal and external antennas. That is, regardless of whether the mobile telephone is held by a right hand or by a left hand, approximately the same communication performance can be achieved.

Figure 10A:
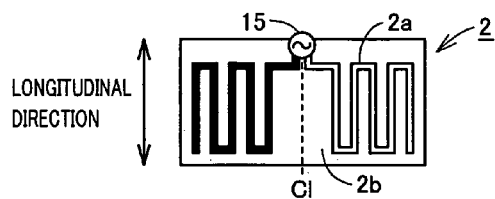
FIG. 10A shows an example of an internal antenna in accordance with the second embodiment of the present invention.
Figure 10B:
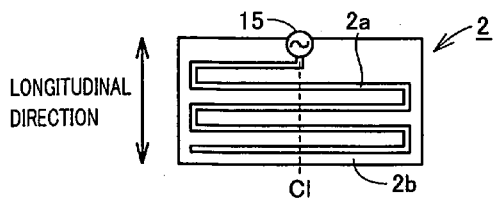
FIG. 10B shows another internal antenna employed in the second embodiment of the present invention.

FIGS. 10A to 10D show various shapes of the internal antennas. The shape of all the internal antennas is symmetrical with respect to line Cl passing through the midpoint of its width and extending in the longitudinal direction. Among these, FIGS. 10A and 10B show internal antennas adapted to a single band. That is, their conductors resonate at a radio wave having a single wavelength. In the internal antenna in FIG. 10A, the shape of the conductor is literally symmetrical with respect to the straight line as described above. In the internal antenna in FIG. 10B, however, its shape is not symmetrical, in the strict sense, with respect to the straight line as described above. However, when the external antenna is inclined to the left and to the right at the same angle with respect to the straight line, the same electromagnetic coupling can be obtained in both cases. Even if the shape of the internal antenna is not exactly symmetrical with respect to the straight line as described, it is assumed that "symmetrical on the basis of electromagnetic coupling" or "approximating symmetrically on the basis of electromagnetic coupling" is attained as long as the level of electromagnetic coupling is identical at either case where the external antenna is inclined to the left or to the right by the same angle with respect to the straight line.

Figure 10C:
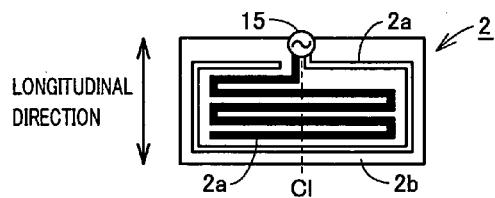
FIG. 10C shows a further internal antenna employed in the second embodiment of the present invention.
Figure 10D:
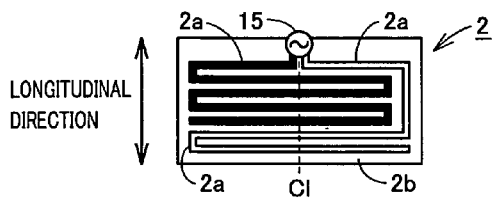
FIG. 10D shows a still further internal antenna different from the internal antennas as shown above employed in the second embodiment of the present invention.

FIGS. 10C and 10D both show the internal antennas adapted to dual bands. In both of FIGS. 10C and 10D, the number of turns of the meandering conductor on insulator 2b in the internal antenna configured for the 800 MHz band is greater than that of the internal antenna configured for the 1.5 GHz band so as to be increased in length. The internal antennas corresponding to respective frequencies in FIGS. 10C and 10D basically have the conductor turn from side to side with respect to a feeding point 15 located at the midpoint of the width of internal antenna 2 to adjust their lengths so that they can resonate at radio waves of desired frequencies. Therefore, the electromagnetic coupling between the external and internal antennas can be the same in both cases where the linear conductor of the external antenna having an attachment end near the feeding point is inclined to the left and to the right at the same angle with respect to the straight line. As a result, regardless of whether the mobile telephone is held by a right hand or by a left hand, the same communication performance can be ensured.

(Third Embodiment)

Figure 11A:
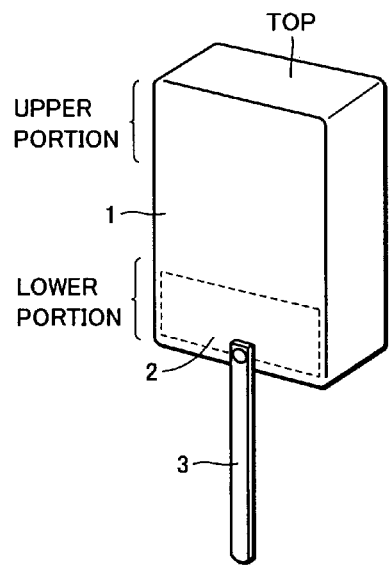
FIG. 11A shows a mobile telephone in accordance with a third embodiment of the present invention.

FIG. 11A is a perspective view of a radio communication terminal in accordance with a third embodiment of the present invention. In the present embodiment, a receiver (not shown) is provided at the upper portion at the surface side of the radio communication terminal. An internal antenna is provided inside a case at the lower portion and the backside of the terminal. An external antenna electromagnetically coupled with the internal antenna is also provided at the lower portion on the backside of the terminal. Provision of the internal antenna close to the bottom results in the external antenna hanging down below the side face or beside the neck of the user during use of the mobile telephone. Thus, the performance of the antenna is less likely to be degraded due to the user's head that could be a big obstacle to the satisfactory performance of the antenna. As a result, the communication performance during use of the mobile telephone can further be improved.

Figure 11B:
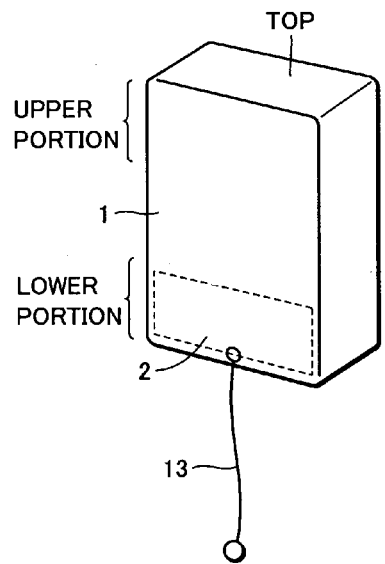
FIG. 11B shows another mobile telephone in accordance with the third embodiment of the present invention.

As shown in FIG. 11A, the external antenna may utilize bar-shaped conductor 3 made of material maintaining a prescribed shape or conductor 3 embedded in a bar-shaped object. Alternatively, as shown in FIG. 11B, a flexible conductor 13 wrapped with a string or the like made of material having no particularly defined shape, for example, fiber, may be utilized.

(Fourth Embodiment)

Figure 12:
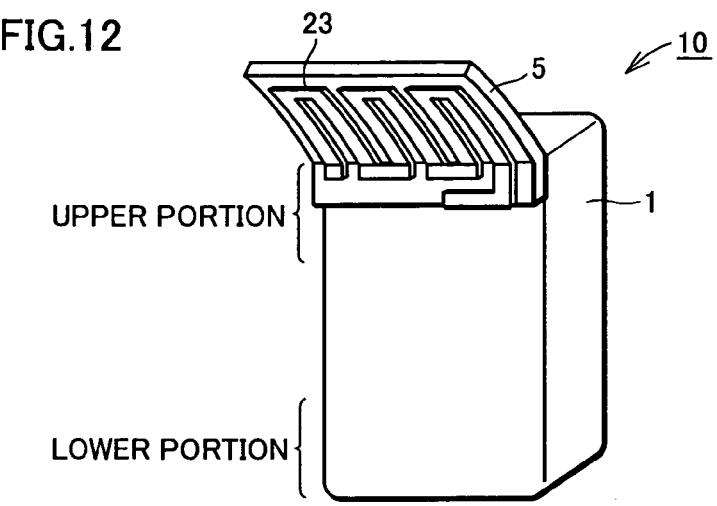
FIG. 12 shows a mobile telephone in accordance with a fourth embodiment of the present invention.

FIG. 12 is a perspective view of a radio communication terminal in accordance with a fourth embodiment of the present invention. In this radio communication terminal, a plate-shaped conductor 23 is provided as an external antenna. The plate-shaped conductor is attached to the radio communication terminal by an insulating plate 5 with the plate-shaped conductor provided thereon attached to case 1. By forming the external antenna from the plate-shaped conductor as described above, the performance of the external antenna can be improved, and thus the communication performance of the whole antenna can be enhanced in a stable manner.

(Fifth Embodiment)

Figure 13:
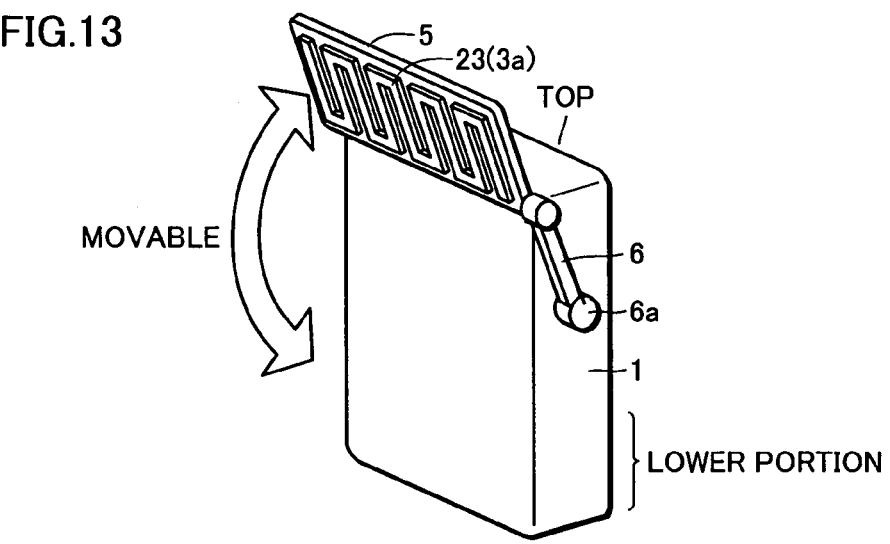
FIG. 13 shows a mobile telephone in accordance with a fifth embodiment of the present invention.
Figure 14:
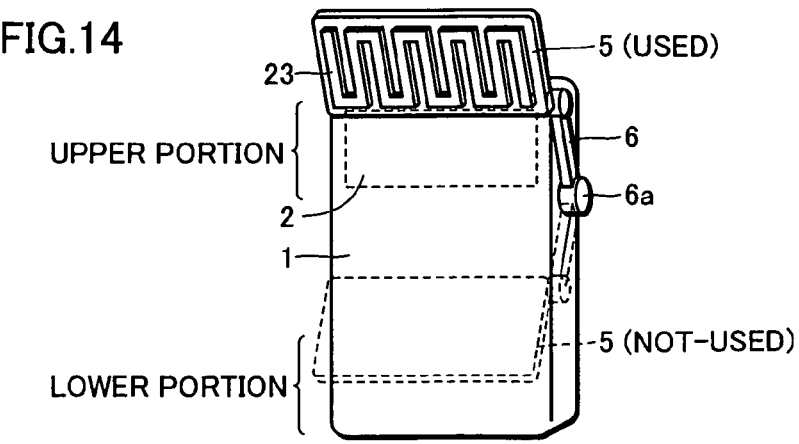
FIG. 14 shows positions of an external antenna of the mobile telephone in FIG. 13 in a used mode and in a non-used mode.

FIGS. 13 and 14 show a radio communication terminal in accordance with a fifth embodiment of the present invention. In the present embodiment, insulating plate 5 with plate-shaped conductor 23 or a linear conductor provided thereon is attached to case 1 by a movable arm 6. Insulating plate 5 is configured to rotate about a shaft 6*a* together with movable arm 6. When the external antenna is in use, it is placed as shown in FIG. 13. When it is not in use, insulating plate 5 is rotated about shaft 6*a* so that it is placed at the lower portion of the case.

In FIG. 14, insulating plate 5 drawn in solid lines shows its position when it is utilized, while insulating plate 5 drawn in dashed lines shows its position when it is not utilized. According to the present embodiment, when the insulating plate is not in use, it can be brought to a position where the internal and external antennas are not electromagnetically coupled. Therefore, the communication capability in a used mode can be improved significantly while ensuing the capability of the internal antenna to merely detect reception in an area where the electric field is weak in a non-used mode. In this configuration, the portability at the time of carrying (not using) the mobile telephone can be ensured.

(Sixth Embodiment)

Figure 15:
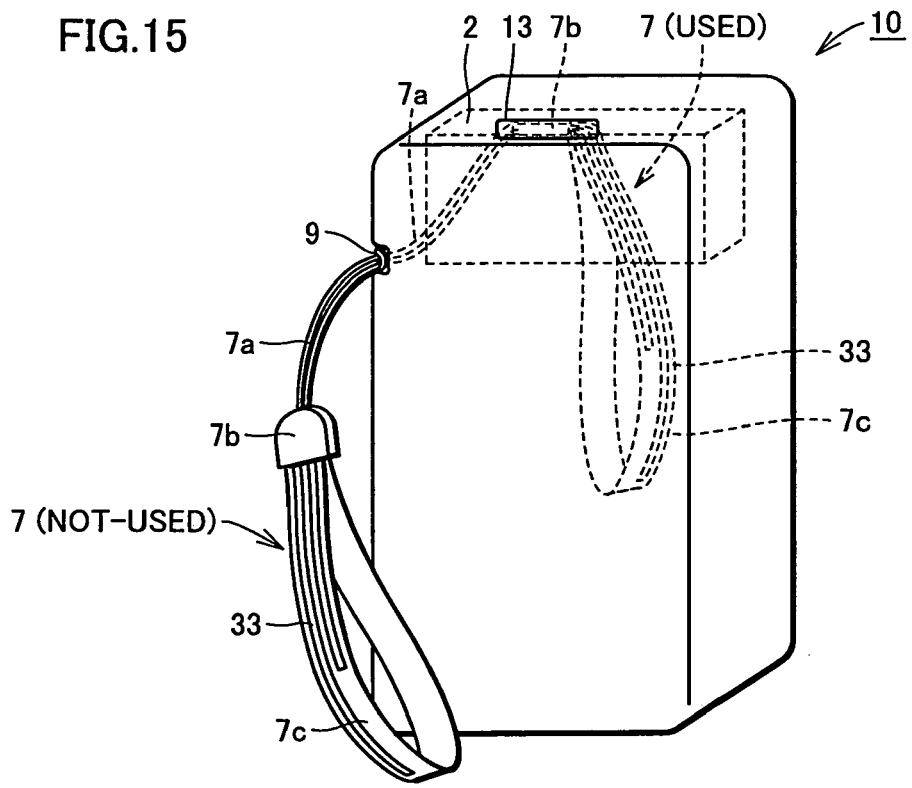
FIG. 15 shows a mobile telephone in accordance with a sixth embodiment of the present invention.
Figure 16:
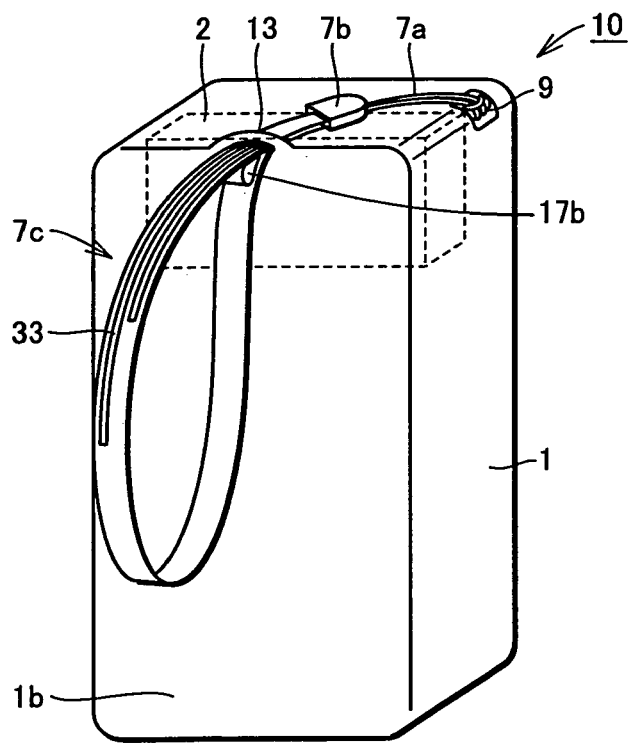
FIG. 16 shows another mobile telephone in accordance with the sixth embodiment of the present invention.

FIGS. 15 and 16 show radio communication terminal 10 in accordance with a sixth embodiment of the present invention. In FIG. 15, a hand strap 7 is attached to a strap attachment portion 9 provided at case 1. An attachment portion 7*a* made of an annular string is directly attached to strap attachment portion 9. An annular strap that a user would wear on his/her wrist is a grip portion 7*c*. A linear conductor 33 serving as an external antenna is incorporated into grip portion 7*c*. A link 7*b* made of resin or the like is provided between attachment portion 7*a* in the form of an annular string and grip portion 7*c*. This link 7*b* has a prescribed size so as to prevent annular string 7*a* of the attachment portion from being detached from the strap attachment portion.

Attachment portion 7*a* of hand strap 7 has a prescribed length. Thus, depending on the position of strap attachment portion 9, the linear conductor provided at grip portion 7*c* may not be able to establish high electromagnetic coupling with the internal antenna. In order to solve such a problem, a strap engagement portion 13 is provided at case 1 as shown by dashed lines in FIG. 15. In FIG. 15, strap engagement portion 13 is provided above internal antenna 2. During use of the mobile telephone, link 7*b* or the like is engaged with strap engagement portion 13. Through engagement of link 7*b* or the like with strap engagement portion 13, the conductor incorporated into grip portion 7*c* can be arranged to face the internal antenna. As a result, when the external antenna is incorporated into the hand strap, high electromagnetic coupling can be achieved between the internal and external antennas.

FIG. 16 shows an embodiment different from the case in FIG. 15 in which the linear conductor is incorporated into the hand strap. In FIG. 16, strap attachment portion 9 is provided at the top of the case of radio communication terminal 10. Strap engagement portion 13 formed from a hole through which grip portion 7*c* passes is provided at the upper portion on the backside of the case. An obstacle 17*b* may be provided to prevent grip portion 7*c* from easily slipping out of hole 13 of the strap engagement portion. According to the attachment configuration of the hand strap shown in FIG. 16, the internal antenna and the external antenna provided at the grip portion can achieve high electromagnetic coupling therebetween regardless of whether the mobile telephone is in use or not. The attachment configuration of the hand strap is not limited to the one as described above. Rather, as long as the external antenna is incorporated into the hand strap, any attachment configuration is included within the scope of the present invention.

Figure 17:
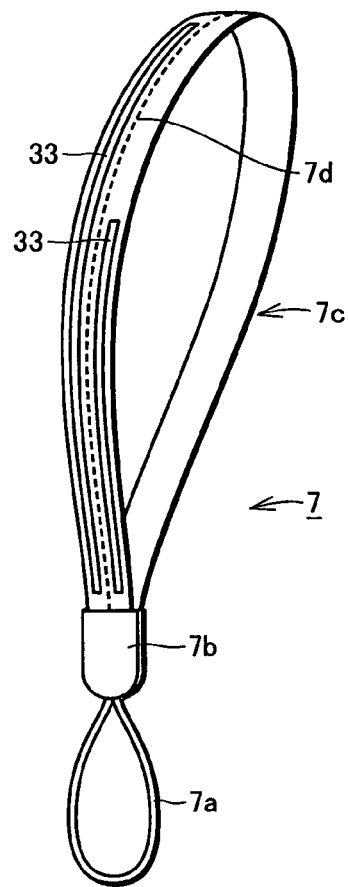
FIG. 17 shows a hand strap utilized for the mobile telephone in accordance with the sixth embodiment of the present invention.
Figure 18:
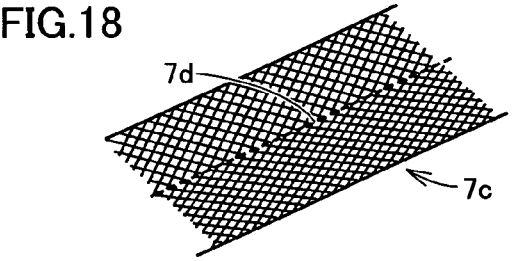
FIG. 18 shows a manufacturing process of the hand strap shown in FIG. 17.
Figure 19:
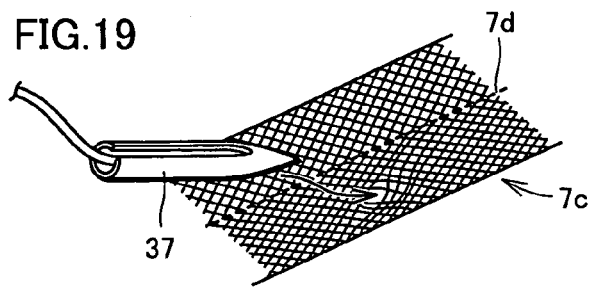
FIG. 19 shows a manufacturing process following the process in FIG. 18.

In the following, a description will be given about the hand strap provided with the external antenna. FIG. 17 shows a hand strap having a grip portion made from a woven strap with which an external conductor is interwoven. This hand strap is configured for dual bands and has two long and short linear conductors interwoven therewith. Grip portion 7*c* of the hand strap has seams 7*d* passing through the midpoint of the width of the grip portion and extending in the longitudinal direction (see FIG. 18). The seams are provided so that linear conductors 33 do not cross each other in the weave texture of the grip portion. In this way, the performance of the antenna can be stabilized. FIG. 19 shows a process in which a wire is sewn into the woven strap having seams by means of a needle 37 with a special shape. Although this needle has a special shape, it is commercially available and easily obtainable.

Figure 20:
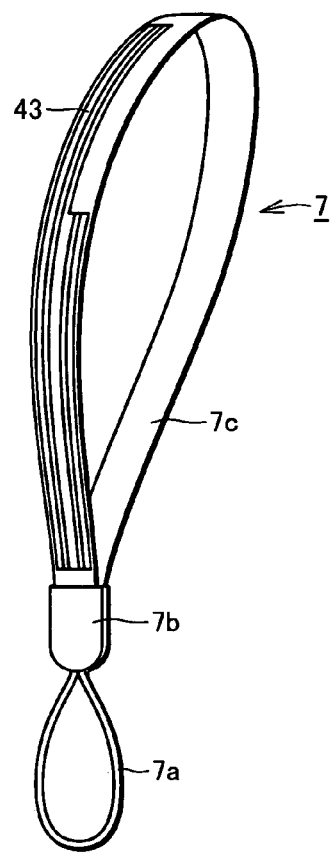
FIG. 20 shows another hand strap utilized for the mobile telephone in accordance with the sixth embodiment of the present invention.
Figure 21:
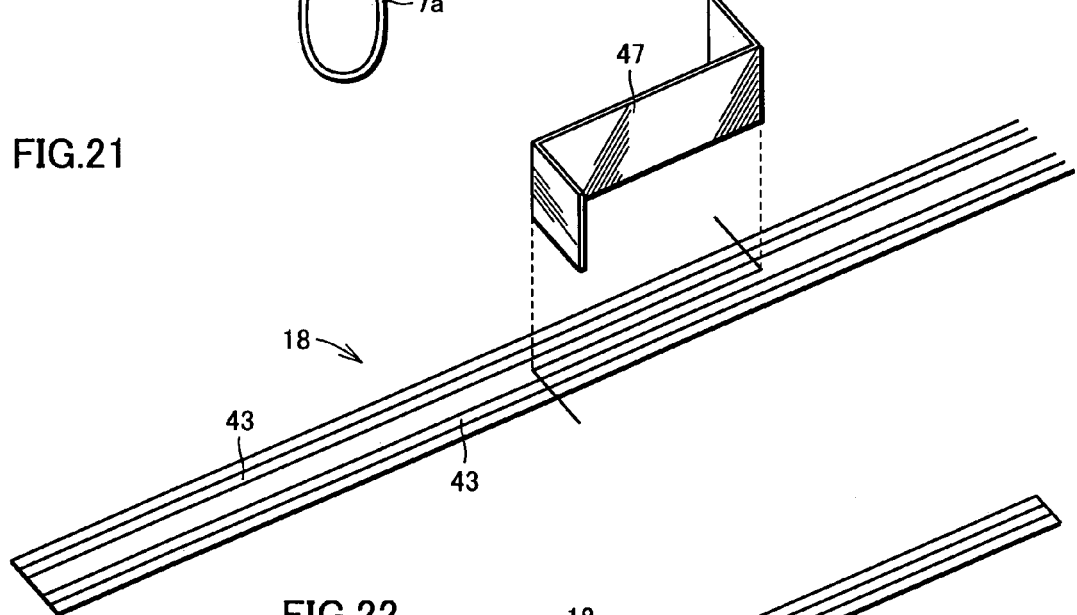
FIG. 21 shows a manufacturing process of the hand strap shown in FIG. 20.
Figure 22:
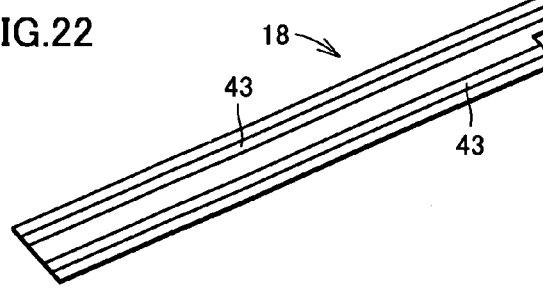
FIG. 22 shows a cable manufactured in the manufacturing process in FIG. 21.

FIG. 20 shows a hand strap with a conductor 43 incorporated thereinto formed as a cable or a microstrip line on a flexible board. As shown in FIG. 21, a cable or a flexible board 18 having two conductors is cut with a Z-shaped cutter 47 to obtain a conductor portion of an external antenna adapted to dual bands. The cable or the flexible board shown in FIG. 22 is to be attached to grip portion 7*c*. The weave texture of the woven strap of grip portion 7*c* may be opened up by a tool such as a prick punch. Then, the cable or the flexible board may be passed through the opened-up texture to be attached to the woven strap of grip portion 7*c*.

By employing the method of manufacturing the hand strap as shown in FIGS. 17 to 22, the linear conductor can be incorporated into the hand strap very efficiently and easily. The above described method of incorporating the linear conductor into the hand strap is illustrative only. Any method may be employed to incorporate a portion serving as an external antenna, i.e. the conductor, into the hand strap.

By attaching the external antenna to the hand strap as described above, the external antenna can be provided without an extra component being attached to the case. This external antenna is to be utilized along with the internal antenna. The internal antenna ensures the basic performance of the antenna, while the external antenna provides additional communication performance. Therefore, the performance of the antenna does not depend on the position of the hand strap or the environment surrounding the hand strap. As a result, stabilized communication performance can be ensured in any environment, and in addition, communication performance higher than that which would be achieved by the internal antenna only can also be obtained almost all the time.

(Seventh Embodiment)

Figure 23:
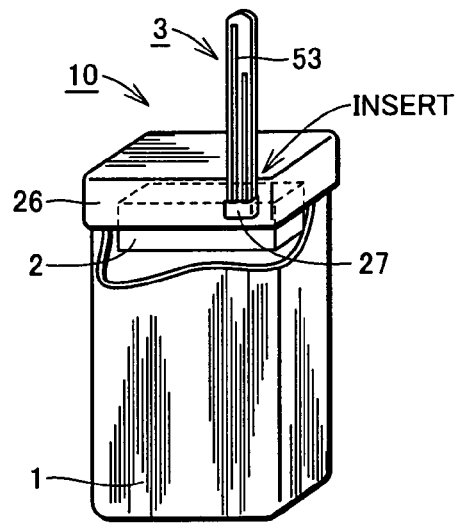
FIG. 23 shows a mobile telephone in accordance with a seventh embodiment of the present invention.
Figure 24:
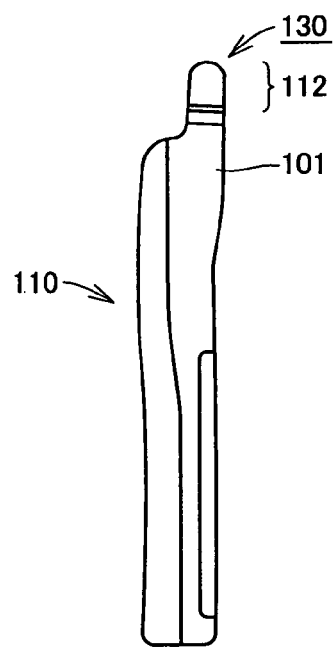
FIG. 24 shows a state in which a whip antenna of a conventional mobile telephone is accommodated.
Figure 25:
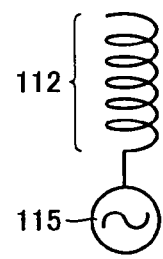
FIG. 25 is an equivalent circuit diagram of the antenna in the state of FIG. 24.
Figure 26:
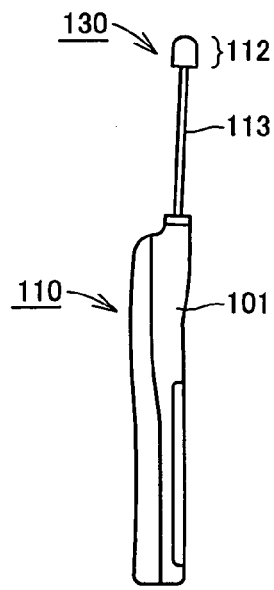
FIG. 26 shows a state in which the whip antenna of the conventional mobile telephone is pulled out.
Figure 27:
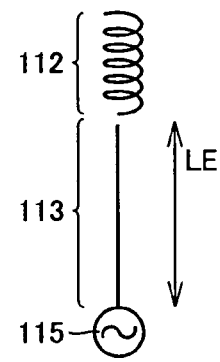
FIG. 27 is an equivalent circuit diagram showing the antenna in the state of FIG. 26.
Figure 28:
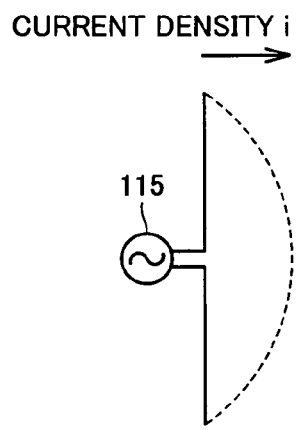
FIG. 28 shows a current density distribution of an excitation current produced at a general dipole antenna.
Figure 29:
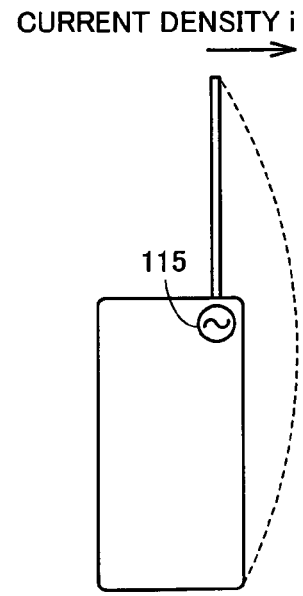
FIG. 29 shows a current density distribution of an excitation current produced at a mobile telephone with its whip antenna pulled out.
Figure 30:
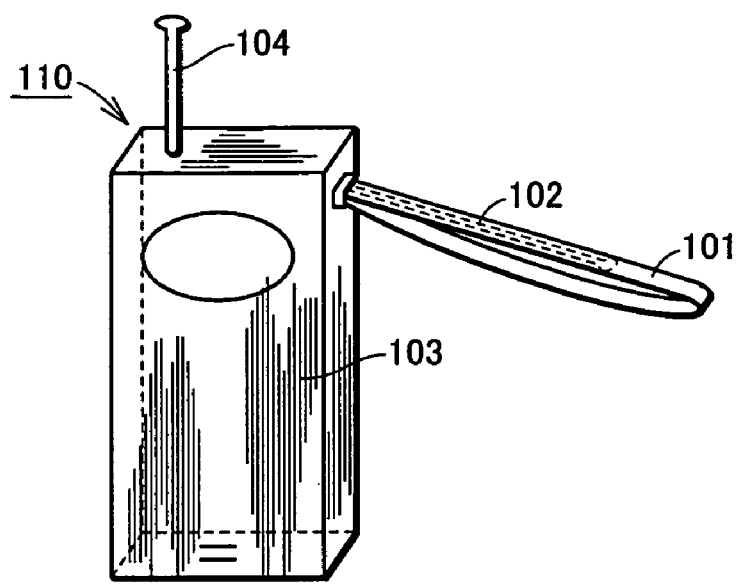
FIG. 30 shows a conventional mobile telephone with the whole antenna incorporated into its hand strap.

FIG. 23 shows a radio communication terminal in accordance with a seventh embodiment of the present invention. In the present embodiment, a cap 26 made of resin or the like is overlaid on the radio communication terminal. During use of the mobile telephone, external antenna 3 is inserted in an antenna attachment portion 27 of the cap. According to the present embodiment, the external antenna can be provided without affecting the structure of the body of the radio communication terminal.

EXAMPLE

The radio communication terminal with the external antenna as described in the first embodiment was utilized to perform testing on the performance of the antenna. For an internal antenna, the one configured for dual bands as shown in FIG. 4 was employed. For an external antenna, the one with two wires as shown in FIG. 3A was employed. The dual bands were two bands, a 900 MHz band and a 1.5 GHz band. The frequencies at which the measurement was carried out were 940 MHz and 1441 MHz in respective bands. As a comparative example, measurements were carried out on a radio communication terminal without an external antenna and having only an internal antenna. Performance comparisons were made between both cases based on the average gain (dBd) during telephone conversation. The result is shown in Table 1.

TABLE 1

| Item | | 940 MHz | 1441 MHz |
|---|---|---|---|
| With External Antenna (Present Invention) | Gain During Conversation (dBd) | −10.6 | −9.4 |
| Without External Antenna (Comparative Example) | Gain During Conversation (dBd) | −15.7 | −15.0 |

According the result in Table 1, in the example of the present invention in which the external antenna was provided, the gain during telephone conversation at the frequency of 940 MHz increased to −10.6 dBd from −15.7 dBd. At the frequency of 1441 MHz as well, the gain during conversation increased to −9.4 dBd from −15.0 dBd. This result shows that combining the external antenna with the internal antenna brought about the significant increase in gain of at least 5 dB during conversation. Accordingly, it turned out that such a significant increase in gain can be achieved by simply attaching the linear conductor externally to the case.

Although the embodiments of the present invention have been described above, the embodiments of the present invention as disclosed above are illustrative only and the scope of the present invention is not limited to these embodiments of the present invention. The scope of the present invention is limited only by the terms of the appended claims and includes all the equivalents of the appended claims and all the variations within the scope of the appended claims.

Industrial Applicability

According to the present invention, the use of the internal antenna within the radio communication device and the external antenna externally attached to the case of the radio communication device makes it possible to ensure the satisfactory communication performance which is not affected by the environment surrounding the radio communication device. Therefore, through application of the present invention to a mobile telephone for example, regardless of the manner in which the user carries the mobile telephone, high communication performance can be ensured in a stable manner even in an area where the electric field is weak. In addition, by simply making a small change to the body of the existing radio communication device, the communication performance of the antenna device and the radio communication terminal can be improved. Such an advantage is of great benefit to the frequently remodeled mobile telephones or Personal Digital Assistants because the time period required for their designing can be shortened.

What is claimed is:

1. A portable radio communication terminal comprising:
a case accommodating a circuit for radio communication:
an internal antenna electrically connected to and incorporated into said circuit; and
an external antenna externally attached to said case and facing said internal antenna with said case therebetween to be electromagnetically coupled with said internal antenna;
a receiver attached to one side of said case; and
said internal antenna and said external antenna are each attached to a side opposite to said one side.

2. The radio communication terminal according to claim 1, wherein said internal antenna and said external antenna are located at an upper portion on the side opposite to said one side.

3. The radio communication terminal according to claim 1, wherein said internal antenna and said external antenna are located at a lower portion on the side opposite to said one side.

4. The radio communication terminal according to claim 1, wherein said external antenna is movably attached to said case by a binding force sufficient to keep said external antenna attached to said case and has a portion facing said internal antennal with said case therebetween such that said external antenna is electromagnetically coupled with said internal antenna when said receiver is held against a user's ear.

5. A portable radio communication terminal comprising:
a case accommodating a circuit for radio communication;
an internal antenna electrically connected to and incorporated into said circuit;
an external antenna externally attached to said case and facing said internal antenna with said case therebetween to be electromagnetically coupled with said internal antenna;
a receiver; and
a microphone,
wherein said receiver and said microphone are attached to one side of said case, and said internal antenna and said external antenna are each attached to a side opposite to said one side.

6. A portable radio communication terminal comprising:
a case accommodating a circuit for radio communication;
an internal antenna electrically connected to and incorporated into said circuit; and an external antenna externally attached to said case and facing said internal antenna with said case therebetween to be electromagnetically coupled with said internal antenna;

wherein said external antenna comprises a linear conductor and has its one end held by said case; and wherein said linear conductor includes at least one of a meandering portion and a helical portion.

7. A portable radio communication terminal comprising:

a case accommodating a circuit for radio communication;

an internal antenna electrically connected to and incorporated into said circuit; and an external antenna externally attached to said case and facing said internal antenna with said case therebetween to be electromagnetically coupled with said internal antenna;

wherein when said internal antenna is divided into a first portion and a second portion by a border line passing through a midpoint of the internal antenna and extending in a longitudinal direction of the case, and a configuration of the first portion of said internal antenna is similar to a configuration of the second portion of said internal antenna.

8. A portable radio communication terminal comprising:

a case accommodating a circuit for radio communication;

an internal antenna electrically connected to and incorporated into said circuit; and an external antenna externally attached to said case and facing said internal antenna with said case therebetween to be electromagnetically coupled with said internal antenna;

wherein said external antenna is a conductor detachably inserted in a cap detachably fit in a top of said case.

9. A portable radio communication terminal comprising:

a case accommodating a circuit for radio communication;

an internal antenna electrically connected to and incorporated into said circuit; and an external antenna externally attached to said case and facing said internal antenna with said case therebetween to be electromagnetically coupled with said internal antenna;

wherein said internal antenna includes a plurality of portions resonating at a plurality of frequencies respectively, and said external antenna includes a plurality of portions resonating at said plurality of frequencies respectively.

* * * * *